(12) United States Patent
Chen

(10) Patent No.: US 10,046,825 B1
(45) Date of Patent: Aug. 14, 2018

(54) ADJUSTABLE BICYCLE HANDLEBAR STEM ASSEMBLY

(71) Applicant: Chao-Hu Chen, Taichung (TW)

(72) Inventor: Chao-Hu Chen, Taichung (TW)

(73) Assignee: KALLOY INDUSTRIAL CO., LTD., Taichung (TW)

( * ) Notice: Subject to any disclaimer, the term of this patent is extended or adjusted under 35 U.S.C. 154(b) by 0 days.

(21) Appl. No.: 15/654,709

(22) Filed: Jul. 20, 2017

(51) Int. Cl.
| | |
|---|---|
| *B62K 21/16* | (2006.01) |
| *B62K 21/22* | (2006.01) |
| *B62K 21/12* | (2006.01) |
| *B62K 21/24* | (2006.01) |

(52) U.S. Cl.
CPC .............. *B62K 21/16* (2013.01); *B62K 21/12* (2013.01); *B62K 21/22* (2013.01); *B62K 21/24* (2013.01); *B62K 2206/00* (2013.01)

(58) Field of Classification Search
CPC ........ B62K 21/16; B62K 21/12; B62K 21/18; B62K 21/22; B62K 21/24; B62K 2206/00
See application file for complete search history.

(56) References Cited

U.S. PATENT DOCUMENTS

| | | | | |
|---|---|---|---|---|
| 5,465,634 A | * | 11/1995 | Chen ...................... | B62K 21/16 280/279 |
| 5,515,744 A | * | 5/1996 | Liao ...................... | B62K 21/16 403/373 |
| 6,192,773 B1 | * | 2/2001 | Liao ...................... | B62K 21/16 280/279 |
| 8,327,737 B2 | * | 12/2012 | Uinnonen .............. | B62K 21/16 74/551.3 |
| 8,402,861 B2 | * | 3/2013 | Olson .................... | B62K 21/16 280/276 |
| 2006/0099027 A1 | * | 5/2006 | Liao ...................... | B62K 21/12 403/322.4 |
| 2007/0186716 A1 | * | 8/2007 | Chen ...................... | B62K 21/16 74/551.3 |

* cited by examiner

*Primary Examiner* — Luis A Gonzalez (57) ABSTRACT

An adjustable handlebar stem assembly includes a vertical tube with a head which has a toothed face. A stem includes two plates which are pivotably connected to the head and includes a clamping portion to clamp a handlebar thereto. A pawl member is pivotably located between the two plates and includes press end and an engaging portion on two ends thereof. The engaging portion has teeth removably engaged with the toothed face. A restriction rod extends through one of the two plates and is connected to a restriction member. A quick-release is pivotably engaged with a curved and recessed face of the pawl member. The quick-release includes a recess with which the restriction member is engaged. The quick-release cannot be pivoted when the restriction member is not moved and disengaged from the recess of the quick-release, so that the stem is not pivoted relative to the vertical tube.

6 Claims, 7 Drawing Sheets

FIG.8

ADJUSTABLE BICYCLE HANDLEBAR STEM ASSEMBLY

BACKGROUND OF THE INVENTION

1. Fields of the Invention

The present invention relates to a handlebar stem assembly, and more particularly, to an adjustable handlebar stem assembly wherein the position of the handlebar relative the handlebar stem is secured.

2. Descriptions of Related Art

The conventional handlebar stem assembly has one end connected to the steering tube of the front fork, and the other end of the handlebar stem assembly is connected with the handlebar. One of the adjustable handlebar stem assembly known to applicant is able to adjust the angular position of the handlebar relative to the handlebar stem. However, the handlebar stem assembly does not have a proper securing mechanism to maintain the handlebar at the adjusted position, so that when the handlebar and the handlebar stem receive severe vibration, the handlebar may be loosened and cause dangerous results to the riders.

The present invention intends to provide an adjustable handlebar stem assembly which includes a quick-release and a pawl member which is engaged with toothed face on the vertical tube of the handlebar stem assembly to ensure that the handlebar is secured and safe.

SUMMARY OF THE INVENTION

The present invention relates to an adjustable handlebar stem assembly comprises a vertical tube and a stem which clamps a handlebar. The vertical tube comprises a head which has a toothed face. The stem comprises two plates extending from the clamping portion, and the two plates are pivotably connected on two ends of the head. A pawl member is pivotably located between the two plates by extending a pin through the two plates and a mediate portion of the pawl member. The pawl member comprises a press end and an engaging portion respectively on two ends thereof. The engaging portion has teeth which are removably engaged with the toothed face. A restriction rod is located above the pawl member and has a first end thereof extending through one of the two plates. A restriction member is connected to the first end of the restriction rod that is located between the two plates. A quick-release comprises a lever which includes a restriction portion extending from the underside thereof. The restriction portion includes a recess which faces the restriction rod. Two lugs extend from the first end of the lever and each have a curved outer periphery which is pivotably in contact with the press end of the pawl member. Each of the two lugs has an eccentric hole and a pivot extends through the two lugs. A bolt has the first end thereof extending from the underside of the stem and is threadedly connected to a threaded hole of the pivot. The second end of the bolt is connected to the stem. The lever of the quick-release is pivotably located between the two plates. The restriction member is engaged with the recess of the restriction portion of the lever. The pawl member is pivotably relative to the pin and engaging portion is engaged with the toothed face of the vertical tube. The restriction member restricts the lever of the quick-release.

Preferably, the press end of the pawl member includes a curved and recessed face through which a bore is defined. The bolt extends through the bore. The two lugs are pivotably in contact with the curved and recessed face.

Preferably, the stem includes an extension which is located beneath the pawl member. The bolt is connected to a nut which contacts against the extension.

Preferably, a sleeve is mounted to the restriction rod and a portion of the sleeve extends through the lug through which the restriction rod extends. A spring is mounted to the restriction rod and biased between the restriction rod and the sleeve.

Preferably, the restriction rod includes a diameter-reduced section so as to form a shoulder. The sleeve includes a flange extending inward from one open end thereof. The spring is mounted to the diameter-reduced section and biased between the shoulder and the flange.

The present invention will become more apparent from the following description when taken in connection with the accompanying drawings which show, for purposes of illustration only, a preferred embodiment in accordance with the present invention.

DETAILED DESCRIPTION OF THE PREFERRED EMBODIMENT

Referring to FIGS. 1 to 5, the adjustable handlebar stem assembly of the present invention comprises a vertical tube 10 and a stem 20, wherein the vertical tube 10 extends through a bicycle head tube, and the stem 20 has a clamping portion 21 on one end thereof so as to clamp a handlebar. The vertical tube 10 comprises a head 11 which has a toothed face 111. The stem 20 comprises two plates 22 extending from the clamping portion 21, and the two plates 22 are pivotably connected on two ends of the head 11.

A pawl member 30 is pivotably located between the two plates 2 by extending a pin 33 through the two plates 22 and a mediate portion of the pawl member 30. The pawl member 30 comprises a press end 31 and an engaging portion 32 respectively on two ends thereof. The press end 31 of the pawl member 30 includes a curved and recessed face 34 through which a bore 341 is defined. The engaging portion 32 has teeth which are removably engaged with the toothed face 111.

A restriction rod 40 is located above the pawl member 30 and has the first end thereof extending through one of the two plates 22. A restriction member 41 is connected to the first end of the restriction rod 40 that is located between the two plates 22.

A quick-release 50 comprises a lever which includes a restriction portion 51 extending from the underside thereof. The restriction portion 51 includes a recess 511 which faces the restriction rod 40. Two lugs 52 extend from the first end of the lever and each have a curved outer periphery which is pivotably in contact with the curved and recessed face 34 of the press end 31 of the pawl member 30. Each of the two lugs 52 has an eccentric hole 53 and a pivot 54 extends through the two lugs 52.

A bolt 55 has a first end thereof extending through the bore 341 from the underside of the stem 20 and is threadedly connected to a threaded hole of the pivot 54. The second end of the bolt 55 is connected to the stem 20. Specifically, the stem 20 includes an extension 23 which is located beneath the pawl member 30. The bolt 55 is connected to a nut 56 which contacts against the extension 23. The lever of the quick-release 50 is pivotably located between the two plates 22. The restriction member 41 can be engaged with the recess 511 of the restriction portion 51 of the lever when the lever is pivoted downward and located between the two plates 22. It is understandable that the paw member 30 is pivotably relative to the pin 33 and engaging portion 32 is engaged with the toothed face 111 of the vertical tube 10. In other words, the restriction member 41 restricts the lever of the quick-release 50 to be pivoted when the restriction member 41 is engaged with the recess 511 of the restriction portion 51, and when the restriction rod 40 is not pushed inward.

A sleeve 42 is mounted to the restriction rod 40 and a portion of the sleeve 42 extends through the lug 52 through which the restriction rod 40 extends. A spring 43 is mounted to the restriction rod 40 and biased between the restriction rod 40 and the sleeve 42. Specifically, the restriction rod 40 includes a diameter-reduced section 44 so as to form a shoulder. The sleeve 42 includes a flange 421 extending inward from one open end thereof. The spring 43 is mounted to the diameter-reduced section 44 and biased between the shoulder and the flange 421.

Figure 1:
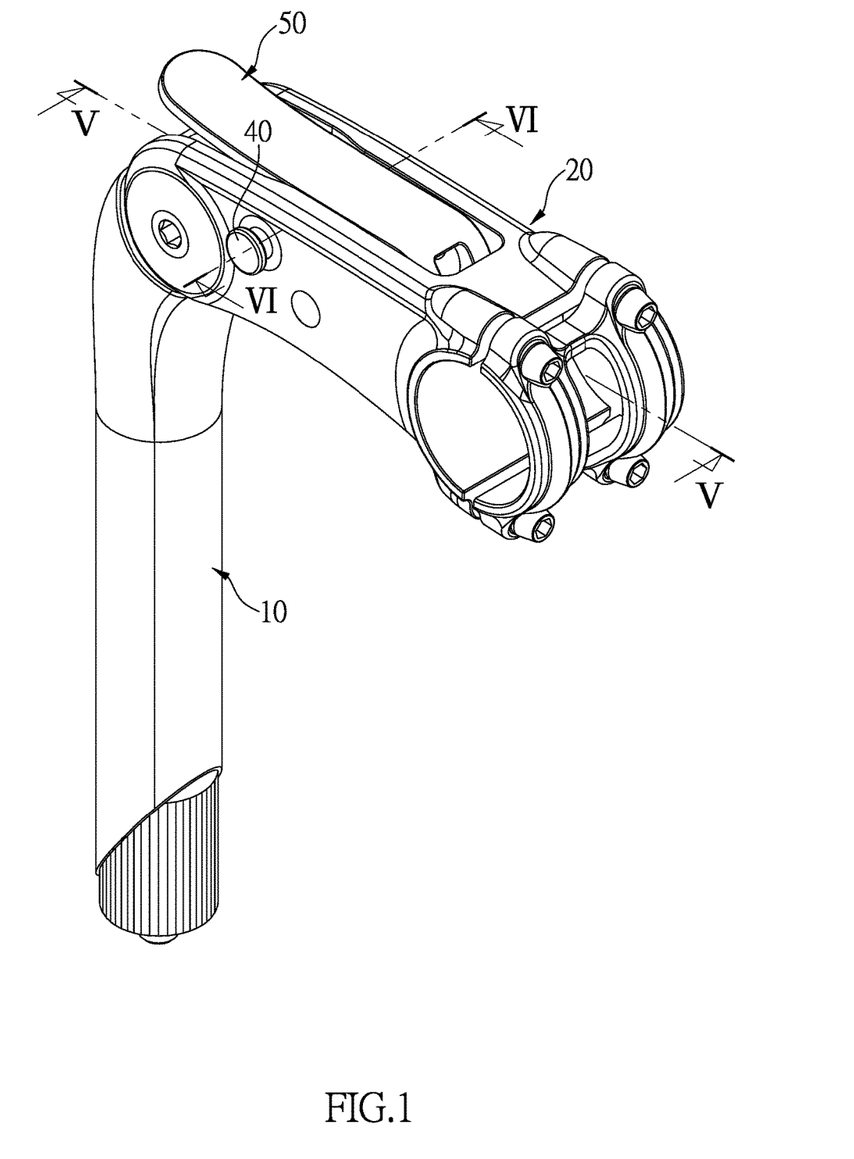
FIG. 1 is a perspective view to show the adjustable handlebar stem assembly of the present invention.
Figure 2:
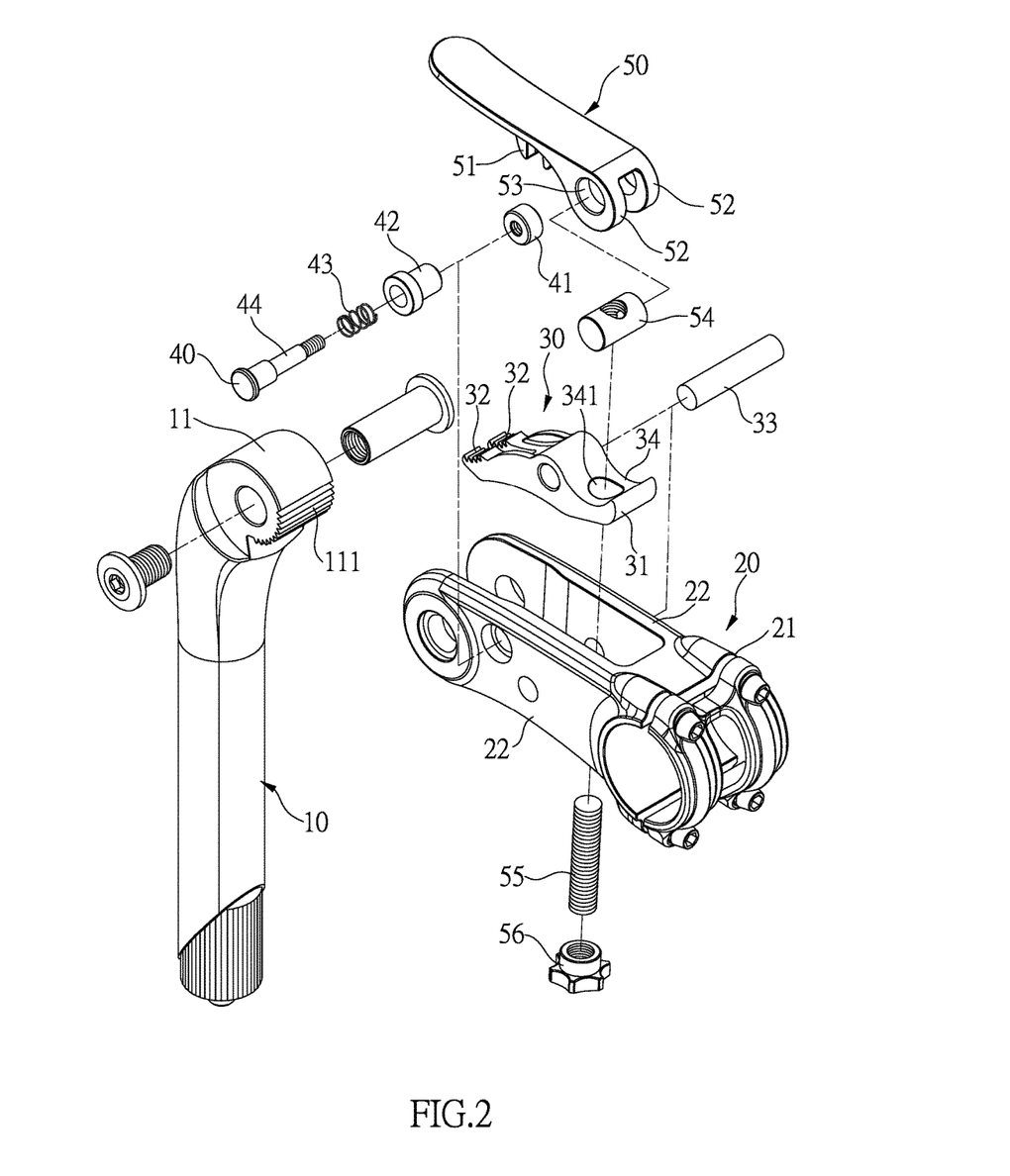
FIG. 2 is an exploded view of the adjustable handlebar stem assembly of the present invention.
Figure 3:
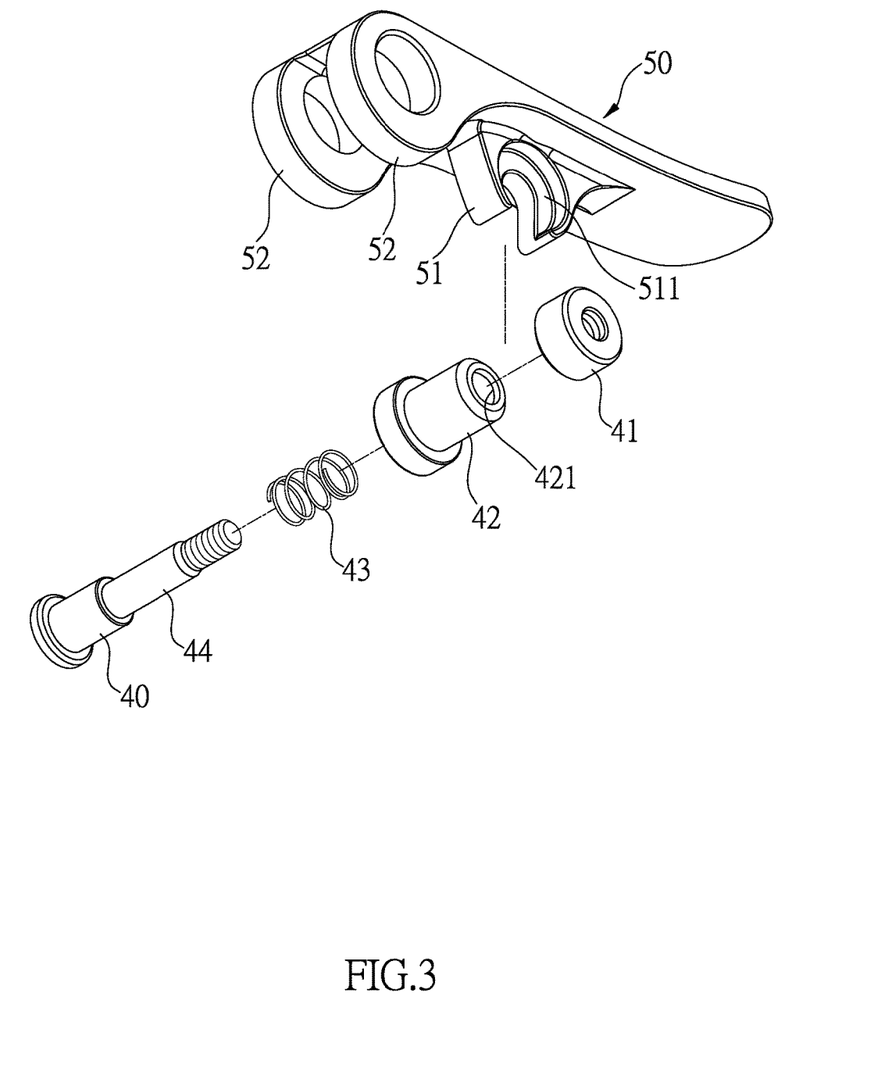
FIG. 3 is an exploded view of the quick-release and the restriction rod of the adjustable handlebar stem assembly of the present invention.
Figure 4:
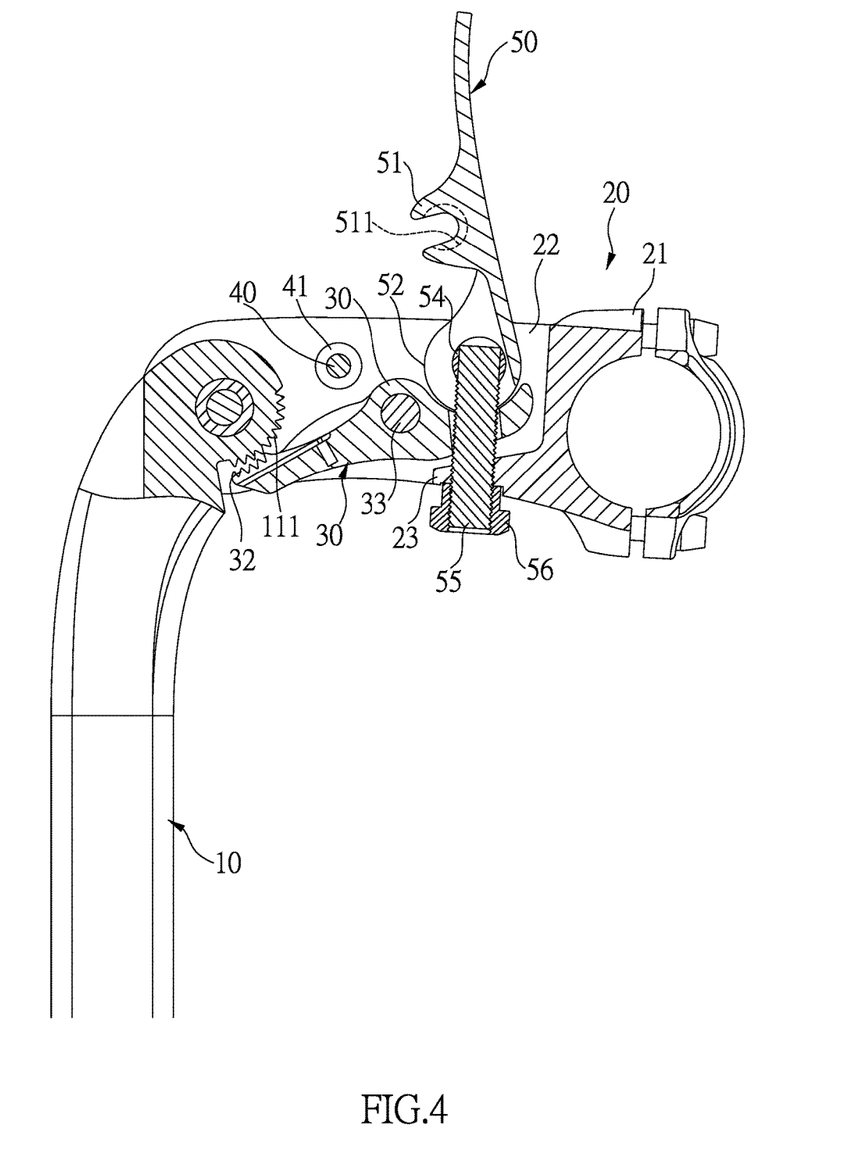
FIG. 4 is a cross sectional view to show that the lever of the quick-release is pivoted upward.
Figure 5:
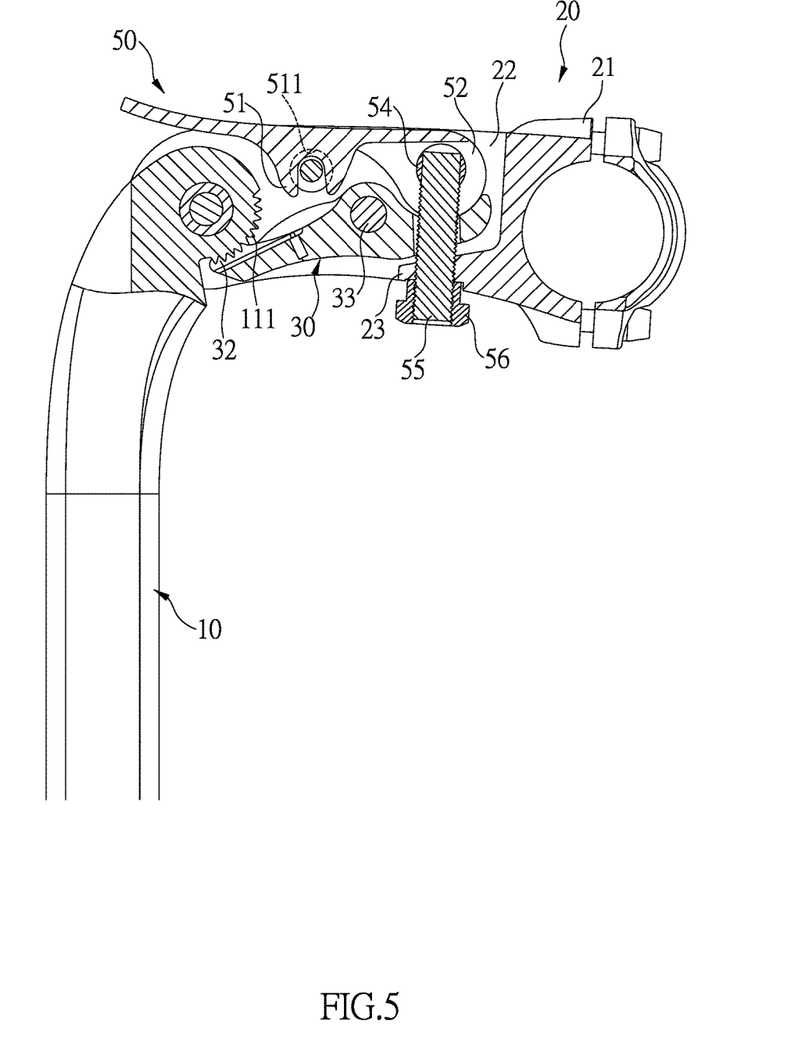
FIG. 5 is a cross sectional view to show that the lever of the quick-release is pivoted downward.
Figure 6:
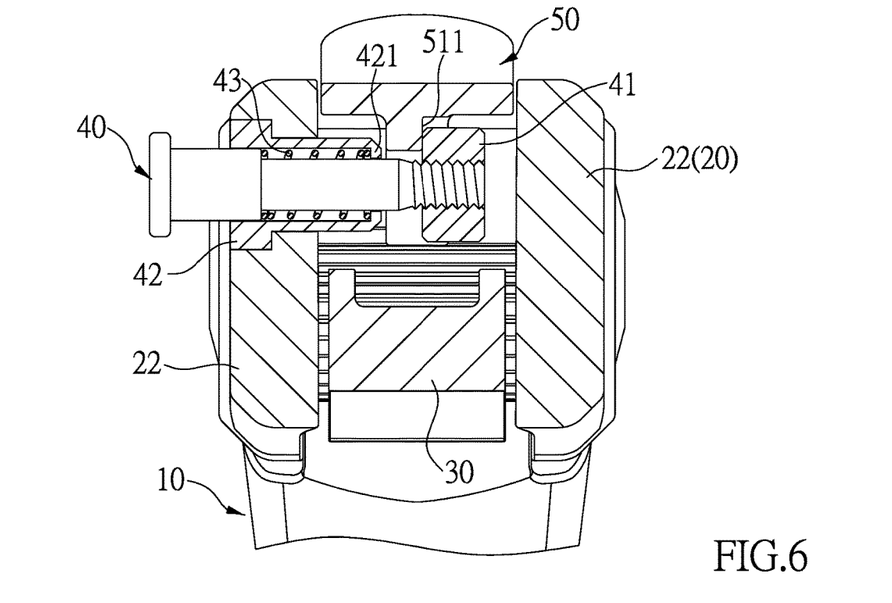
FIG. 6 is a cross sectional view to show that the restriction rod is not yet pushed inward relative to the stem.

Because the lugs 52 of the quick-release 50 each have the eccentric hole 53, so that when the lever is pivoted downward, the bolt 55 is lifted upward to securely press the lugs 52 on the curved and recessed face 34, and the pawl member 30 is pivoted to firmly engage the engaging portion 32 of the pawl member 30 with the toothed face 111 of the head 11 of the vertical tube 10. Therefore, the stem 20 is securely positioned relative to the vertical tube 10. In the meanwhile, as shown in FIG. 6, the restriction member 41 is engaged with the recess 511 of the restriction portion 51 of the lever, and the spring 43 pulls the restriction rod 40 to securely engage the restriction member 41 with the recess 511 of the restriction portion 51 or the lever. The recess 511 is shaped to have a smaller opening at the lower end thereof so that the lever cannot be pivoted upward because the restriction member 41 cannot pass through the smaller opening at the lower end of the recess 511. The restriction member 41 can removed from the recess 511 of the restriction portion 51 of the lever by pushing the restriction rod 40.

Figure 7:
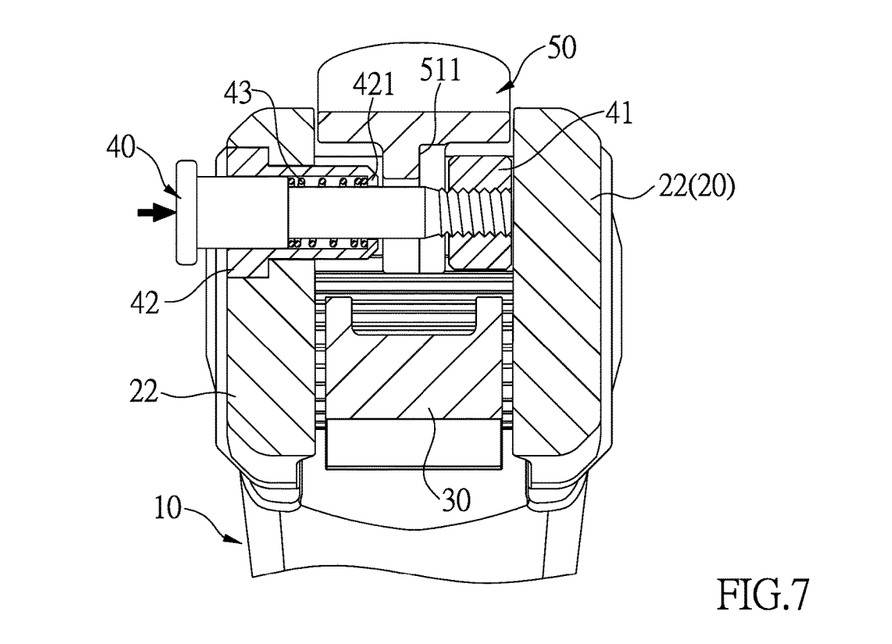
FIG. 7 is a cross sectional view to show that the restriction rod is pushed inward relative to the stem.
Figure 8:
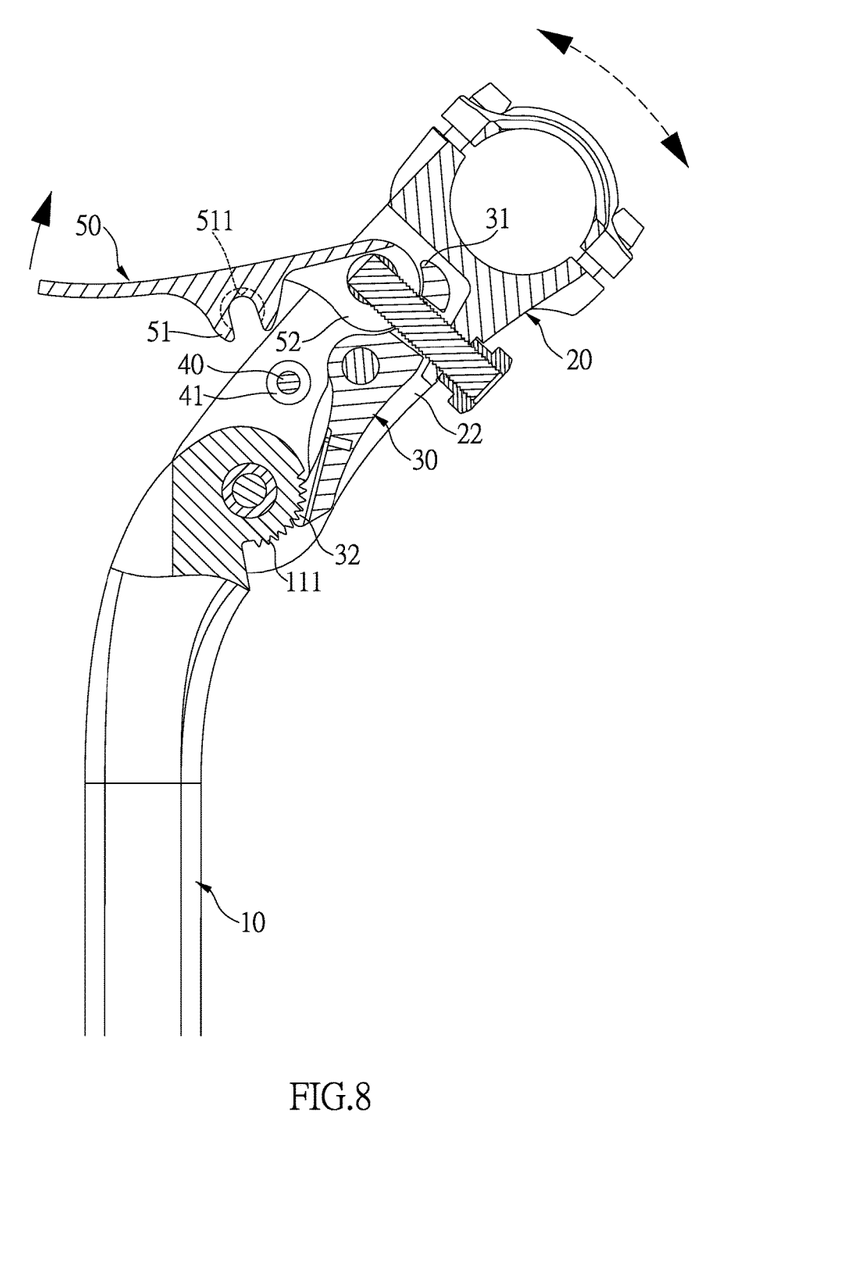
FIG. 8 is a cross sectional view to show that the lever of the quick-release is pivoted upward, and the stem is adjusted relative to the vertical tube.

As shown in FIG. 7, when the restriction rod 40 is pushed inward, the restriction member 41 is disengaged from the recess 511 of the restriction portion 51 of the lever, and the lever can be pivoted upward to loosen the bolt 55. The engaging portion 32 of the pawl member 30 is no longer firmly engaged with the toothed face 111 of the vertical tube 10, and stem 20 can be pivoted an angle relative to the vertical tube 10 as shown in FIG. 8. When the desired position of the stem 20 is set, the lever of the quick-release is pushed downward again to firmly engage the engaging portion 32 of the pawl member 30 with the toothed face 111 of the vertical tube 10.

While we have shown and described the embodiment in accordance with the present invention, it should be clear to those skilled in the art that further embodiments may be made without departing from the scope of the present invention.

What is claimed is:

1. An adjustable handlebar stem assembly comprising a vertical tube (10) adapted to extend through a bicycle head tube, a stem (20) having a clamping portion (21) on one end thereof and the clamping portion (21) adapted to clamp a handlebar, wherein:

the vertical tube (10) comprises a head (11) which has a toothed face (111);

the stem (20) comprises two plates (22) adapted to extend from the clamping portion (21), the two plates (22) pivotably connected on two ends of the head (11);

a pawl member (30) is pivotably located between the two plates (22) by extending a pin (33) through the two plates (22) and a mediate portion of the pawl member (30), the pawl member (30) comprises a press end (31) and an engaging portion (32) respectively on two ends thereof, the engaging portion (32) has teeth which are removably engaged with the toothed face (111);

a restriction rod (40) is located above the pawl member (30) and has a first end thereof extending through one of the two plates (22), a restriction member (41) is connected to the first end of the restriction rod (40) that is located between the two plates (22), and a quick-release (50) comprises a lever which includes a restriction portion (51) extending from an underside thereof, the restriction portion (51) includes a recess (511) which faces the restriction rod (40), two lugs (52) extend from a first end of the lever and each have a curved outer periphery which is pivotably in contact with the press end (31) of the pawl member (30), each of the two lugs (52) has an eccentric hole (53) and a pivot (54) extends through the two lugs (52), a bolt (55) has a first end thereof extending from an underside of the stem (20) and is threadedly connected to a threaded hole of the pivot (54), a second end of the bolt (55) is connected to the stem (20), the lever of the quick-release (50) is pivotably located between the two plates (22), the restriction member (41) is engaged with the recess (511) of the restriction portion (51) of the lever, the pawl member (30) is pivotably relative to the pin (33) and engaging portion (32) is engaged with the toothed face (111) of the vertical tube (10), the restriction member (41) restricts the lever of the quick-release (50).

2. The adjustable handlebar stem assembly as claimed in claim 1, wherein the press end (31) of the pawl member (30) includes a curved and recessed face (34) through which a bore (341) is defined, the bolt (55) extends through the bore (341), the two lugs (52) are pivotably in contact with the curved and recessed face (34).

3. The adjustable handlebar stem assembly as claimed in claim 1, wherein the stem (20) includes an extension (23) which is located beneath the pawl member (30), the bolt (55) is connected to a nut (56) which contacts against the extension (23).

4. The adjustable handlebar stem assembly as claimed in claim 2, wherein the stem (20) includes an extension (23)

which is located beneath the pawl member (30), the bolt (55) is connected to a nut (56) which contacts against the extension (23).

5. The adjustable handlebar stem assembly as claimed in claim 1, wherein a sleeve (42) is mounted to the restriction rod (40) and a portion of the sleeve (42) extends through the lug (52) through which the restriction rod (40) extends, a spring (43) is mounted to the restriction rod (40) and biased between the restriction rod (40) and the sleeve (42).

6. The adjustable handlebar stem assembly as claimed in claim 5, wherein the restriction rod (40) includes a diameter-reduced section (44) so as to form a shoulder, the sleeve (42) includes a flange (421) extending inward from one open end thereof, the spring (43) is mounted to the diameter-reduced section (44) and biased between the shoulder and the flange (421).

\* \* \* \* \*